US012201093B2

(12) United States Patent
McCombe

(10) Patent No.: US 12,201,093 B2
(45) Date of Patent: Jan. 21, 2025

(54) BROOD BOX FOR A BEEHIVE

(71) Applicant: James McCombe, Somerville, MA (US)

(72) Inventor: James McCombe, Somerville, MA (US)

( * ) Notice: Subject to any disclaimer, the term of this patent is extended or adjusted under 35 U.S.C. 154(b) by 0 days.

(21) Appl. No.: 18/091,918

(22) Filed: Dec. 30, 2022

(65) Prior Publication Data
US 2024/0215550 A1     Jul. 4, 2024

(51) Int. Cl.
*A01K 47/00* (2006.01)
*A01K 47/06* (2006.01)

(52) U.S. Cl.
CPC .................... *A01K 47/06* (2013.01)

(58) Field of Classification Search
CPC ................ A01K 49/00; A01K 51/00
See application file for complete search history.

(56) References Cited

U.S. PATENT DOCUMENTS

| | | | |
|---|---|---|---|
| 3,438,070 A | 4/1969 | Florance | |
| 4,135,265 A | 1/1979 | Van De Kerkof | |
| 4,455,699 A * | 6/1984 | Brown | A01K 4/06 6/4 R |
| 4,483,031 A * | 11/1984 | Shaparew | A01K 47/06 |
| 4,546,509 A | 10/1985 | Huetter | |
| 5,211,597 A | 5/1993 | Scott et al. | |
| 6,830,499 B1 | 12/2004 | Wills | |
| 8,430,714 B2 | 4/2013 | Benincasa et al. | |
| 8,485,859 B2 | 7/2013 | Yildrim | |
| 9,826,721 B2 | 11/2017 | Anderson et al. | |
| 11,310,998 B2 | 4/2022 | Bajan | |
| 11,425,893 B2 | 8/2022 | Logan | |
| 11,771,064 B2 * | 10/2023 | Struhl | A01K 47/06 |
| 2010/0022161 A1 | 1/2010 | Shtatnov | |
| 2016/0015007 A1 * | 1/2016 | Sinanis | A01K 47/06 |
| 2016/0002960 A1 | 2/2016 | Heidinger | |

(Continued)

FOREIGN PATENT DOCUMENTS

| | | |
|---|---|---|
| CN | 205455344 U | 8/2016 |
| CN | 109197677 A | 1/2019 |

(Continued)

OTHER PUBLICATIONS

YouTube video: I Fixed the Langstroth Hive (For The Bees AND The Keeper!), https://www.youtube.com/watch?v=z768OIA3bMo.

(Continued)

*Primary Examiner* — Joshua J Michener
*Assistant Examiner* — Henry Hooper Mudd
(74) *Attorney, Agent, or Firm* — Bulkley, Richardson and Gelinas, LLP; Mary R. Bonzagni, Esq.

(57) ABSTRACT

A brood box for a beehive includes a main box having a plurality of sides and a bottom configured to be in a continuous and seamless unibody structure and defining a cavity inside the main box, each of the plurality of sides and the bottom being continuously insulated with one another to thereby insulate and thermally isolate the main box cavity from an environment outside of the brood box. Also included is a transition plate configured to be disposed on top of the main box cavity, and an insulated lid configured to interface with the plurality of sides of the main box and being disposed to cover the main box cavity and the transition plate in certain weather conditions.

20 Claims, 6 Drawing Sheets

(56) References Cited

U.S. PATENT DOCUMENTS

| | | | |
|---|---|---|---|
| 2016/0353714 | A1 | 12/2016 | Manzer et al. |
| 2019/0327943 | A1 | 10/2019 | Huva, II |
| 2019/0364853 | A1 | 12/2019 | Voisin et al. |
| 2020/0205383 | A1* | 7/2020 | Linder .................. A01K 47/06 |
| 2020/0253168 | A1 | 8/2020 | Pearson |
| 2021/0078796 | A1* | 3/2021 | PierreB .................. B65F 1/00 |
| 2021/0259216 | A1 | 8/2021 | Waring |
| 2021/0400925 | A1* | 12/2021 | Harvey .................. A01K 47/06 |

FOREIGN PATENT DOCUMENTS

| | | |
|---|---|---|
| CN | 208317904 U | 1/2019 |
| CN | 214282761 U | 9/2021 |
| DE | 202019003813 U1 | 9/2019 |
| DE | 102020003797 B4 | 1/2022 |
| EP | 2981167 A1 | 2/2016 |
| NL | 1043143 | 2/2019 |
| WO | 2018/16051 A1 | 9/2018 |

OTHER PUBLICATIONS

Website: American Langstroth Bee hive 8 frames (roof, 2 x body, bottom), not painted (lyson.eu); https://lyson.eu/.
"Thermo Beehive Plastic Insulated Bee Hive Set Thermo Beehive Box bee House," gometim.com. Accessed: Nov. 11, 2022. https://www.gometim.com/thermo-beehive-plastic-insulated-bee-hive-set thermo-beehive-box-bee-house-no-frames-included-one-layer-492 Discloses insulated bee hives made from food grade, UV-resistant plastic (HDPE).
"Apimaye Insulated Bee Hives," apimaye-usa.com. Accessed: Nov. 11, 2022. https://apimaye-usa.com/ Discloses an R value 6.93 beehive with more than 6 times more heat insulating than wooden hives.
"The Insulated Langstroth Hive," semaponline.org. Accessed: Nov. 11, 2022. https://semaponline.org/wp-content/uploads/2019/04/FAF-insulated-hive.pdf Discloses a hive with added insulation.
Wakjira K, Negera T, et al. "Smart apiculture management services for developing countries—the case of SAMS project in Ethiopia and Indonesia," https://www.ncbi.nlm.nih.gov/pmc. PeerJ Comput Sci 2021, vol. 7, 484. Apr. 9, 2021. Discloses smart apiculture management services for developing countries—the case of SAMS project in Ethiopia and Indonesia—PMC (nih.gov).

* cited by examiner

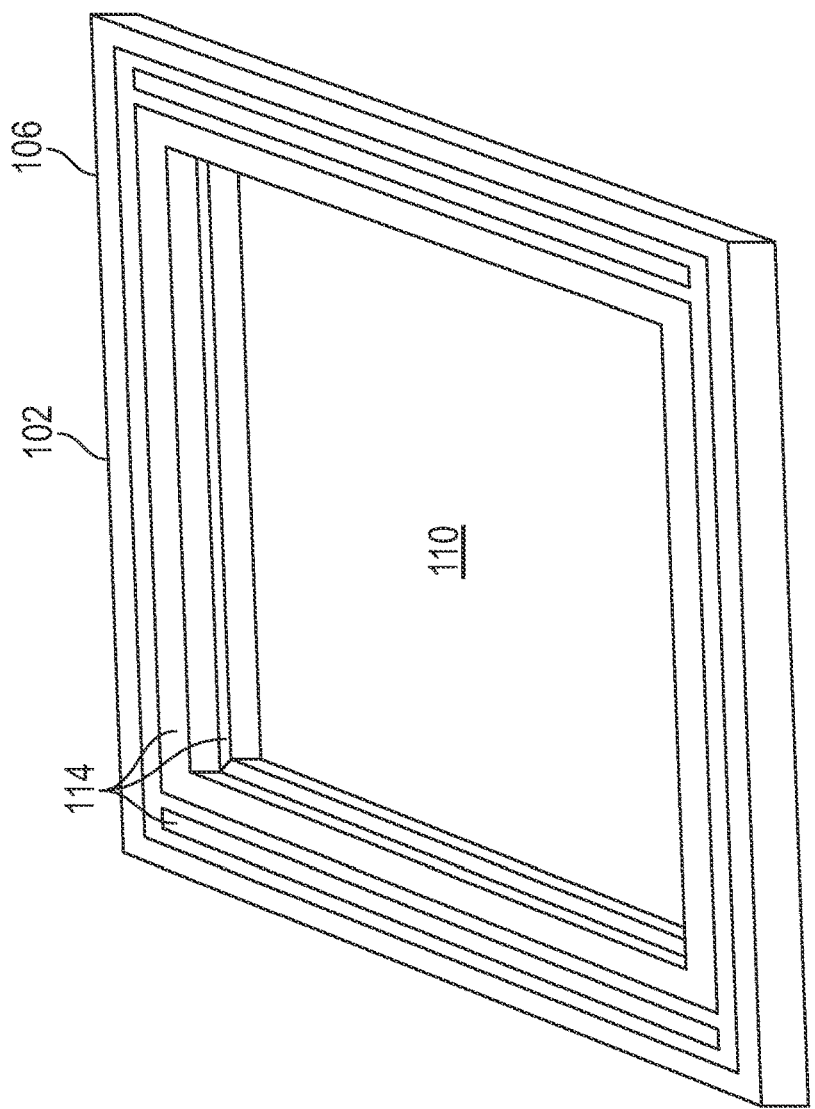
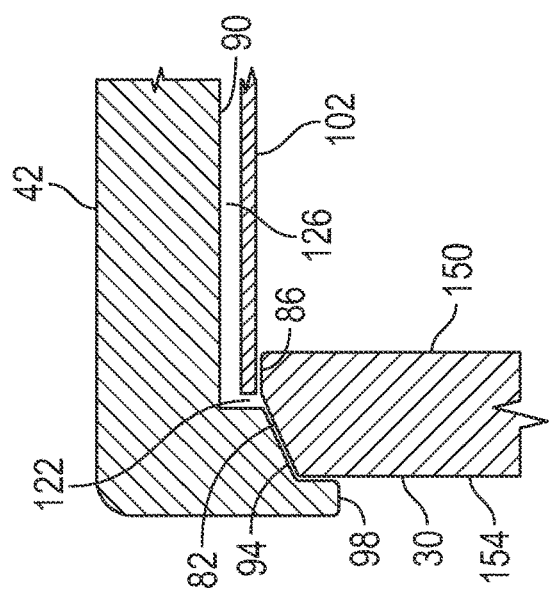
FIG. 5
FIG. 4

BROOD BOX FOR A BEEHIVE

FIELD OF THE INVENTION

The subject matter disclosed herein relates in general to beehives, and more specifically to a fully and continuously insulated brood box for use as part of a beehive and having several improvements over known, prior art brood boxes and beehives.

BACKGROUND OF THE INVENTION

In the art of artificial, man-made beehives or apiaries for honeybees, there are several known types that have been popular over the years. The most popular type still in widespread use today is the Langstroth beehive, which dates its origin to around 1850 and which has not significantly changed over the years. The Langstroth beehive is a vertically stackable design having individual components such as rectangular boxes (e.g., brood box, supers, covers) and removable hanging frames inside the boxes. Each frame has a foundation or artificial comb onto which a comb is built by the bees over time. The boxes and frames are usually made of a relatively thin (¾ inch thick) soft wood such as pine. This is done primarily to make commercial production and shipping easy and the resulting cost to own relatively inexpensive.

In the Langstroth beehive, the brood box (aka brood "chamber" or brood "cavity") is located at the bottom of the vertical stack and is where the queen bee lives with the rest of the honeybee colony (i.e., the worker bees and drones) and lays her eggs. Thus, the brood box is often considered to be the most important structure within a beehive. One or more super boxes ("supers") are located above the brood box and are the "containers" into which the worker bees store excess honey for use by the bees and for harvesting by the beekeeper. The supers are typically only located on top of the brood box in the warmer summer months and are removed in the fall or winter and after the honey has been harvested. The honey in the brood box is generally not harvested but instead is for the use of the colony of bees. The brood box is commonly greater in height than the supers; thus, the brood box is usually referred to as a "deep" box while a super is usually referred to as a "medium" box. There can be more than one brood box stacked together in the vertical stack (i.e., a "double brood box"), and the brood boxes can be of the same or differing heights (e.g., both brood boxes being deep boxes, or one brood box being deep and the other brood box being medium).

A queen excluder is typically provided between the brood box and the supers to prevent the queen bee from traveling up into the supers and laying her eggs there while allowing the smaller worker bees to travel freely between the brood box and the supers. A bottom board and one or more covers are usually provided to complete the Langstroth beehive design. Typically, a main entrance opening, running the full width of the hive, is located at the very bottom of the stack of boxes to allow the bees to travel in and out to gather nectar and return to make honey and tend to the brood. Some beekeepers also provide additional upper openings at the top of the hive. Also, the brood box and supers are typically kept together in the vertical stack by gravity. As such, oftentimes a beekeeper will wrap the entire beehive with a ratchet strap to prevent the beehive from toppling over.

As a result of its simplistic wooden design, the Langstroth beehive, and specifically, the Langstroth brood box, is inherently poorly insulated, which is a problem for both the bees and the beekeeper in Northern climates in both the winter and summer. For example, the temperature inside the brood box must always be maintained in a range between approximately 92 Degrees Fahrenheit (92° F.) and 97° F. for the brood to survive. The brood box is essentially an incubator for the colony of honeybees during the warm months of the year and is also the winter home of the colony. The thin, soft pine wood in a Langstroth beehive has a very low insulating value of approximately R1, which makes the temperature-regulating job of the bees much more difficult. If the temperature inside the brood box gets too warm in the summer, the bees will begin to fan their wings in an attempt to lower the temperature. Conversely, if the inside temperature gets too cold in the winter, the bees will huddle together and vibrate as a ball around the queen bee to generate heat using energy from stored honey that they consume. Either way, the out-of-range temperatures inside the brood box cause the bees to expend tremendous energy in an attempt to keep the brood alive both in summer and winter, instead of having the bees perform their normal duties of foraging for resources (e.g., gathering nectar) and tending to the brood. Oftentimes a beekeeper is required to add emergency food (e.g., sugar water or honey) into the brood box during the winter months. This is to provide the bees with a sufficient supply of food to prevent them from starving and to allow the bees to expend the energy required to keep the brood box warm and the brood alive.

Also, the soft wood of the Langstroth components is ill-suited to sit out in the elements for years, nor take the abuse of constant assembly and disassembly of the beehive by the beekeeper every time the hive needs to be inspected. Further, the soft wood needs to be repeatedly painted or treated, and this type of finish must be regularly maintained, which is difficult due to the weight of the brood boxes when filled with honey and thousands of bees. Thus, the soft, thin wood is not an ideal material for the beekeeper and is even worse for the bees. As a result, the Langstroth beehive suffers from many performance and maintenance issues.

There have been numerous known attempts over the years to improve upon various aspects and features of the original Langstroth beehive design. These include, for example, use of a plastic material instead of wood for the various components as well as implementing designs that increase the airflow through the brood box itself and the beehive. The use of plastic components can help mitigate somewhat against harsh weather conditions and prolong the useful life of the wooden components of the brood box and beehive, but a lack of insulation or an increase in ventilation can be detrimental to the bees.

Another known practice is for beekeepers to attempt to better insulate their beehives in winter by wrapping the brood boxes and the entire beehive in a variety of different insulating materials for example, plastic, polystyrene, tar paper, fiberglass, etc. This can be problematic for the beekeeper and unless done properly, it is of little practical use for the bees since a poor insulation job still allows heat to easily escape from the beehive. Also, many beekeepers wrap their brood boxes for winter, but they remove the insulation in the warmer months. This is mainly due to a mistaken belief that an insulated hive in the summer will overheat the bees inside the hive.

However, the proper use of insulation does not result in the generation of heat. Instead, the insulation merely slows the transfer of heat from one location to another. Thus, a properly insulated brood box makes for a more controlled environment (i.e., temperature and humidity) for the bees since it is much slower to overheat (if at all) in summer and much slower to freeze (if at all) in winter. As such, the bees have a much easier time regulating their own temperature and humidity in a properly insulated brood box.

Another problem with prior art attempts to insulate a beehive is that if the insulation does not completely enclose the brood box, the brood box may be exposed to the cold winter air and condensation can form. Specifically, if any areas inside the brood box get below the dew point, water will condense on the surfaces in that area and will drip over the inside of the brood box and hive. As it is, the bees spend all winter inside the hive consuming honey and respiring, thereby creating a lot of moisture themselves inside the hive. Any additional excess moisture can result in the wood components in the hive becoming swelled and saturated over the course of the winter. Also, mold can form and the wood may begin to warp, thereby affecting its longevity. In addition, if the bottom of the brood box is not insulated or sealed completely, frigid air can easily enter the bottom of the hive during winter, and during summer, insects such as ants and wax moths can easily enter the brood box and beehive and cause problems for the bee colony inside.

Furthermore, the use of plastic to replicate the traditional wooden beehive components tends to not make much else of a difference in the brood box and hive. This is because the mere use of plastic doesn't solve the inherent problems with Langstroth beehives of allowing air to flow through the brood box and the hive. The airflow is due in part to poor or inadequate insulation, poor air sealing, and to a design choice to include an air vent at the top of the beehive which allows air to flow inside the hive between the upper vent and the lower bee passage hole/vent and/or the bottom board. The airflow passing through the brood box and beehive creates a chimney effect, pulling heat out of the brood box and hive during the colder months. Also, a vented bottom board (either by design or by poor insulation) allows for wind to whip up into the hive. While the air flow may not be much of a problem in the warmer summer months, it is detrimental to the survival of the bee colony in colder months. In fact, it is counterintuitive and counterproductive to insulate the brood box and hive to some extent and then allow a flow of cold winter air to pass through the entire hive. The present inventor has proven through actual prototype experimentation that the bees do not need or want an upper vent and thus the flow of colder air during winter months, and instead they will attempt (and will succeed) in closing off the vent themselves.

Yet another problem with wooden Langstroth beehives is that when the brood boxes are stacked it is difficult for the beekeeper to open the beehive to view the brood box at the bottom of the stack to check on the queen bee and the other bees. In addition, opening the beehive in the cold winter months lets cold air inside which poses a health risk to the bees inside.

In addition, the wooden frames that hang inside the brood boxes of a Langstroth beehive have several problems. One problem is that there are typically 8-10 frames within a brood box. If a hive uses two brood boxes stacked on each other, there could be 16-20 frames within the entire brood box configuration. This results in a very laborious process of removing each of up to 20 frames per hive along with multiple lifts of stacked brood boxes during each hive inspection, which can be difficult for the beekeeper when they want to inspect the brood box to check on the health of the queen bee and the other bees. Also, an undesirable situation can arise in stacked boxes in that the queen bee needs to bridge or "jump the gap" between an upper box frame and the corresponding lower box frame when laying her eggs on the combs of the frames.

Other common types of man-made beehives are of horizontal designs instead of vertical designs like the Langstroth beehive. These horizontal designs have numerous inherent problems of their own, which are not addressed herein.

Therefore, in light of these and other problems with known, prior art designs for Langstroth beehives, what is needed is an improved design of the brood box that teaches away from known, prior art, poorly constructed and poorly insulated brood box designs.

BRIEF SUMMARY OF THE INVENTION

An object of embodiments of the present invention is to provide a brood box that is fully insulated with seamless, continuous insulation, which enables bees to more easily maintain the proper temperature and humidity year-round inside the brood box, thereby allowing the bees to spend more time carrying out their normal activities and less time trying to maintain the proper temperature and humidity inside the brood box too try to keep the brood or cluster of bees alive inside the brood box.

Another object of embodiments of the present invention is to provide a brood box that eliminates any thermal bridges between the outside environment and the inside climate of the brood box.

Still another object of embodiments of the present invention is to provide a brood box that prevents cold air from entering the brood box and causing damaging condensation inside the brood box.

Another object of embodiments of the present invention is to provide a brood box that eliminates any unnecessary venting at the top and bottom of the hive, other than the main entrance.

Yet another object of embodiments of the present invention is to provide a brood box that is of a unibody design, thereby eliminating problems with prior art designs that utilize separate sidewalls or boards and a bottom board.

Another object of embodiments of the present invention is to provide a brood box that can be used together with existing, standard-size Langstroth supers and other Langstroth or other branded, common sized beehive equipment during the warmer summer months.

Still another object of embodiments of the present invention is to provide a brood box with an observation window which makes it possible for a beekeeper to observe the frames inside the brood box without the need to remove the air-sealed lid for inspection during wintertime.

Yet another object of embodiments of the present invention is to provide a brood box configuration within a beehive in which the cavity inside equals two or more brood boxes stacked together, which allows for use of larger sized frames inside.

Another object of embodiments of the present invention is to provide a brood box that is a better representation of the natural cavities or hollows inside of trees.

Still another object of embodiments of the present invention is to provide an improved brood box that mimics the generally deep and narrow vertical shape of a tree cavity or hollow, which is the natural home of a colony of bees.

Yet another object of embodiments of the present invention is to provide a brood box in which the addition of food (e.g., sugar water or honey) by the beekeeper during the winter months is not needed to keep the colony or cluster of bees in the brood box alive.

Another object of embodiments of the present invention is to provide a brood box that improves upon the winter survivability rate of the colony of bees living inside the brood box.

Still another object of embodiments of the present invention is to provide a brood box that provides the bees with a thermally stable environment to live in, thereby enabling the bees to produce more honey and more brood and have a far easier time surviving cold winters.

Yet another object of embodiments of the present invention is to provide a brood box that provides the bees living inside with protection from the large temperature swings of daily and seasonal weather changes outside the box, thereby allowing the bees to more efficiently regulate their own temperature and humidity levels, which is necessary for proper brood rearing inside the brood box.

Another object of embodiments of the present invention is to provide a brood box that makes the job of the beekeeper in maintaining the beehive easier and less stressful, and more efficient and enjoyable.

According to exemplary embodiments of the present invention, a brood box for a beehive includes a main box having a plurality of sides and a bottom configured to be in a continuous and seamless unibody structure and defining a cavity inside the main box, each of the plurality of sides and the bottom being continuously insulated with one another to thereby insulate and thermally isolate the main box cavity from an environment outside of the brood box. Also included is a transition plate configured to be disposed on top of the main box cavity, and an insulated lid configured to interface with the plurality of sides of the main box and being disposed to cover the main box cavity and the transition plate in certain weather conditions.

BRIEF DESCRIPTION OF THE DRAWINGS

The subject matter, which is regarded as the disclosure herein of exemplary embodiments of the present invention, is particularly pointed out and distinctly claimed in the claims at the conclusion of this specification. The forgoing and other features and advantages of the present invention will become more apparent from the following detailed description taken in conjunction with the accompanying drawings in which:

FIG. 4 is a cross-sectional view of a portion of the brood box of FIGS. 1 and 2, according to exemplary embodiments of the present invention;

FIG. 5 is a top perspective view of a transition plate configured to be disposed inside the brood box of FIGS. 1 and 2, according to exemplary embodiments of the present invention;

DETAILED DESCRIPTION OF THE INVENTION

Figure 1:
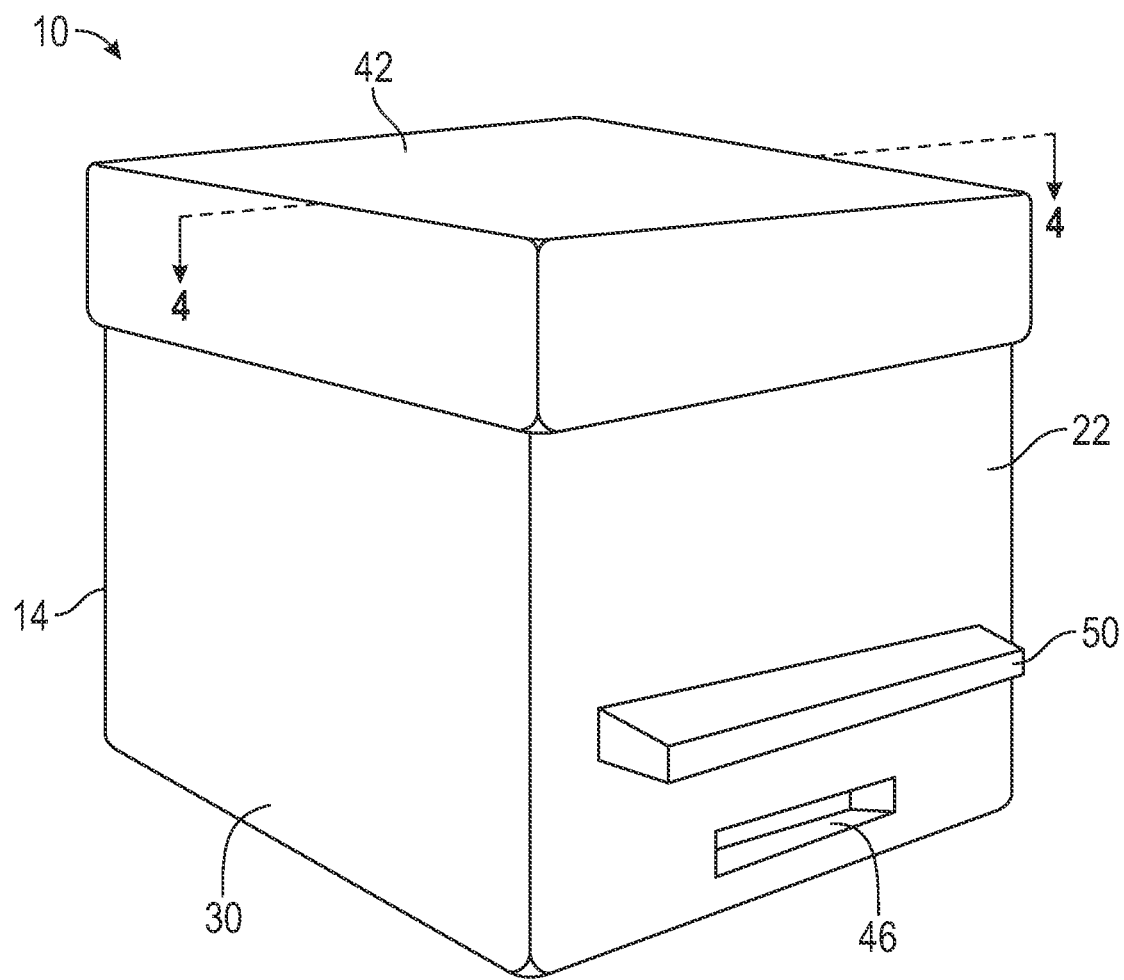
FIG. 1 is a front perspective view of a brood box for use as part of a man-made beehive, according to exemplary embodiments of the present invention.

It should be understood that throughout this patent application and specifically in the written description that follows and in the accompanying drawing figures, various directional and orientational terms such as horizontal, vertical, diagonal, up, down, upward, downward, in, out, inward, outward, forward, backward, sideways, front, rear, back, top, bottom, side, upper, lower, left, right, center, middle, above, below, and other similar directional and orientational terms as they are used herein refer to the brood box of the various exemplary embodiments of the present invention as that brood box is oriented when typically being assembled or in use. All these terms are used in this written description and in the drawings for convenience only and as an aid to better understanding the exemplary embodiments of the present invention. These terms are not intended to be limiting in the claims or to imply that the brood box must be used or positioned in any particular or specific direction or orientation while being assembled or in use to satisfy the limitations of the claims.

Figure 2:
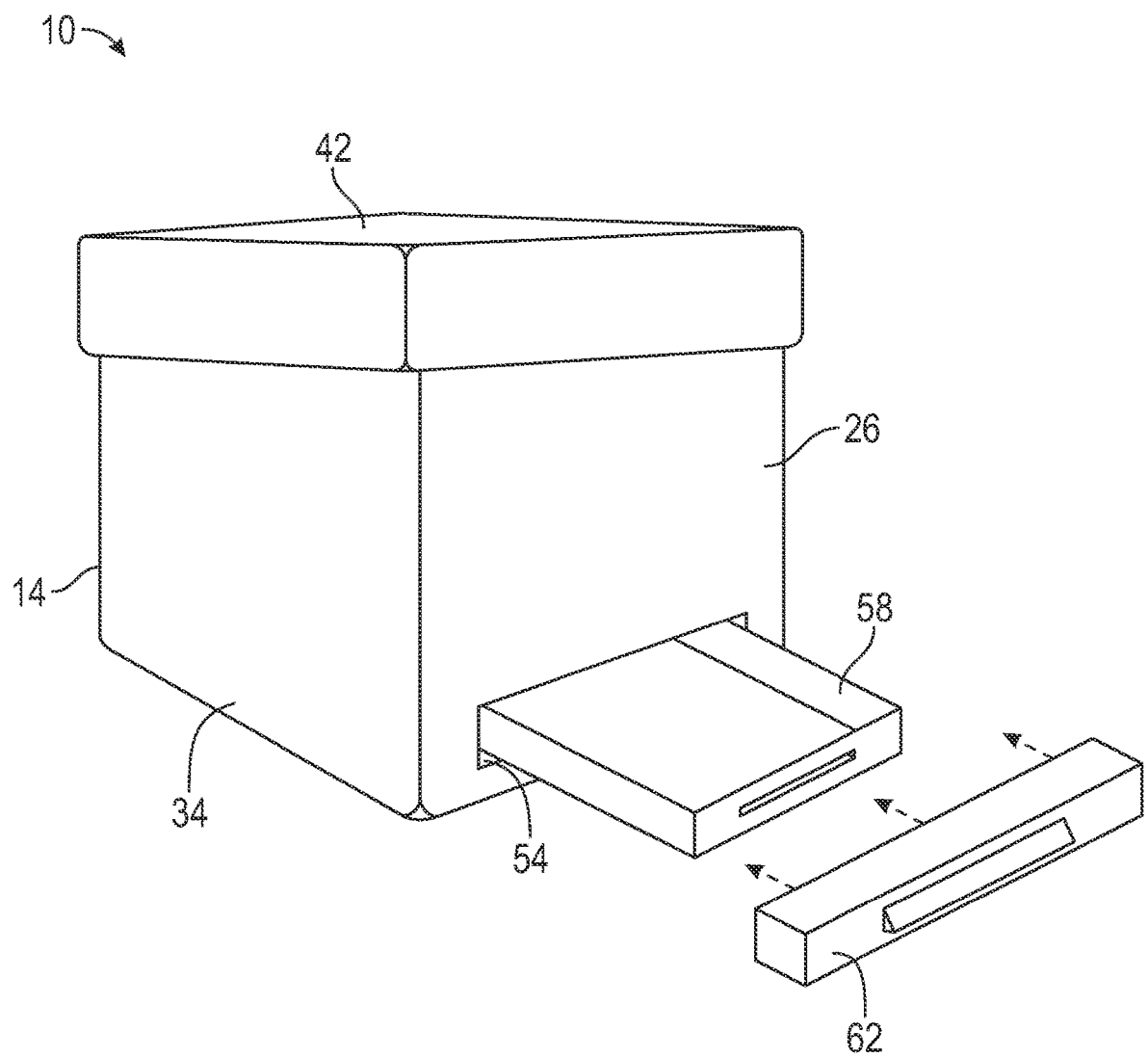
FIG. 2 is a rear perspective view of the brood box of FIG. 1, according to exemplary embodiments of the present invention.

Referring to FIGS. 1 and 2, there illustrated are front and rear perspective views, respectively, of an improved brood box 10 for housing a colony or cluster of bees (e.g., honeybees) year-round, according to various exemplary embodiments of the present invention described and illustrated in detail herein. The brood box 10 may be known by other names such as a brood chamber, a brood cavity, or others as is common in the relevant art. The brood box 10 of FIGS. 1 and 2 is primarily for use as an integral component of the well-known Langstroth type beehive. This type of beehive typically has vertically stackable components, as described hereinabove in the "BACKGROUND OF THE INVENTION" section and as further described and illustrated in greater detail hereinafter. However, it should be understood that the brood box 10 of FIGS. 1 and 2 is not limited for use in a Langstroth type beehive and may also be utilized in other types of beehives now known or otherwise developed in the future, which should be apparent to one of ordinary skill in the art in light of the detailed teachings herein.

FIGS. 1 and 2 illustrate the brood box 10 as a fully insulated product having a unibody structure and construction. The brood box 10 is also sealed to the outside air and environment, except for three openings described and illustrated in greater detail hereinafter. Notwithstanding these three openings, there is no airflow through the brood box 10. One of the openings (i.e., the opening in the rear wall described in detail hereinafter) is sealed by a door most of the time. This lack of airflow through the brood box 10 contrasts with, and directly teaches away from, known, prior art brood boxes and beehives that teach and provide for the use of an airflow through the brood box and beehive (even during the cold winter months) purportedly for the benefit of the bees inside.

Figure 3:
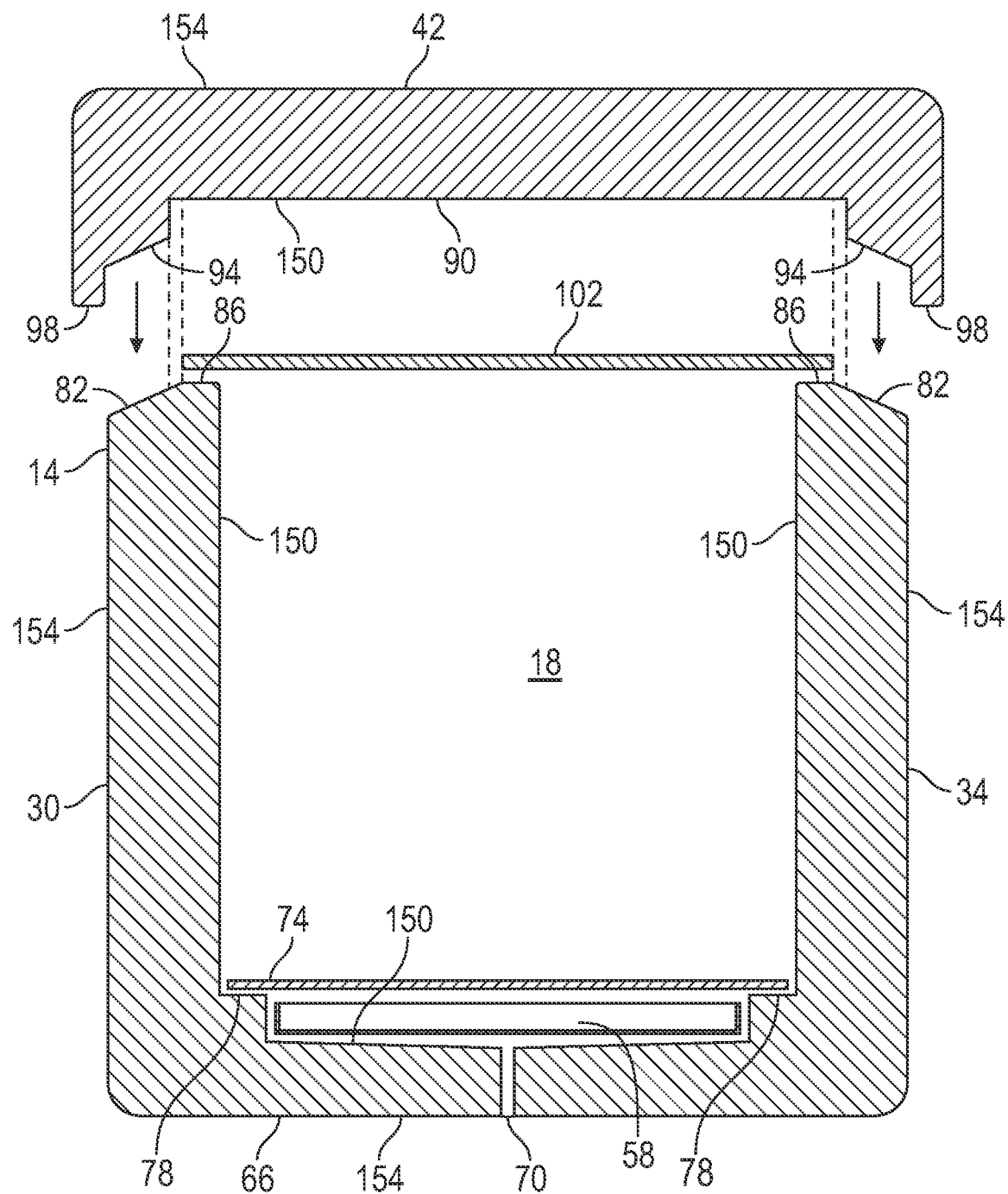
FIG. 3 is a partially-exploded, front cross-sectional view of the brood box of FIGS. 1 and 2 taken along lines 4-4 of FIG. 1, according to exemplary embodiments of the present invention.

Referring also to FIG. 3, there illustrated in cross section and partially exploded is the brood box 10 of FIGS. 1 and 2. The brood box 10 comprises a cube-shaped main box 14 that is completely hollow inside (i.e., it has a central or main cavity 18), which is similar to known, prior art Langstroth brood boxes. In various exemplary embodiments of the present invention, the hollow box portion 14 of the brood box 10 has four sidewalls 22, 26, 30, 34 and is rectangular in shape similar to the Langstroth brood box. The hollow box portion 14 of the brood box 10 thus defines a central cavity 18 which accommodates a plurality of frames 38 that are hung in parallel to one another inside the hollow box cavity 18, as described and illustrated in greater detail hereinafter. The four sidewalls 22, 26, 30, 34 of the hollow box cavity 18 of the brood box 10 are generally vertical (i.e., straight up and down and not angled) in their orientation during use. The hollow box portion 14 of the brood box 10 may be also referred to herein as the main box 14.

The brood box 10 also includes a lid 42 that fits on top of the hollow box cavity 18 or main box 14. The lid 42 is insulated and is used to completely enclose and seal off the top of the main box 14 to the outside environment during the colder winter months. The various features of the insulated lid 42 and its interface with the main box 14 are described and illustrated in greater detail hereinafter.

A front surface or wall 22 of the brood box 10 includes one of the three openings formed in the brood box 10, for example, a rectangular-shaped opening near the bottom of the brood box 10. The opening 46 is utilized by the bees for entering and exiting (ingress and egress) the brood box 10. This opening or main entrance 46 also provides the bees inside the brood box 10 with a relatively small yet sufficient supply of needed fresh air. Note, however, that this opening 46 does not provide for an unwanted flow of cold air through the brood box 10 in those colder months. The front surface or wall 22 of the brood box 10 may also include an awning 50 which functions to shield or protect the opening 46 from e.g., rain, snow, and sun. The front surface 22 may also include tabs or attachment points for mouse guards (not shown) to cover the entrance opening 46, preventing mice from entering the brood box 10.

A rear surface or wall 26 of the brood box 10 includes a rectangular shaped opening 54 near the bottom of the brood box 10. This opening 54 is the second of the three openings formed in the outer walls 22-34 of the brood box 10. This opening 54 allows a drawer or tray 58 to slide in and out of the brood box 10. The drawer 58 normally resides within the hollow box cavity 18 inside the brood box 10 at the bottom and serves as a collection box for, e.g., mites, pests, and debris. The drawer or tray 58 can be easily slid out of the brood box 10 for inspection and emptying of its contents by the beekeeper. FIG. 2 shows the drawer or tray 58 after it is pulled out of the brood box 10. Also, the drawer or tray 58 may comprise a single piece of plastic or foam material, may have sidewalls that are, e.g., ¾ inch high, and may have a footprint that is approximately the same as the inside dimensions of the brood box 10.

Furthermore, a rear door 62 may be provided which covers the rectangular opening 54 in the brood box 10 when the drawer or tray 58 is located inside the brood box 10. As such, the rear door 62 may be slip fit or snap fit into place within the opening 54. That way, a tight seal is formed which doesn't allow any unwanted air flow or pests from outside to enter inside the brood box 10 when the drawer or tray 58 is inside. The rear door 62 may be made of the same material as the walls 22-34 of the brood box 10 and may have the same thickness as that of the rear wall 26 of the brood box 10, to thereby sit flush with the outside surface of the brood box 10 and continue the sealed envelope of the brood box 10. In use, all the beekeeper needs to do is to merely pop out the door 62 which then exposes the debris tray 58 inside, which can then be slid out and emptied and then replaced inside the brood box 10.

As best seen in FIG. 3, the brood box 10 eliminates the need for a typical bottom board. This structural component is integrated into and with the sidewall structure of the hollow box cavity 18. Specifically, the "bottom board" 66 is formed integral with the four side walls 22-34 of the cube-shaped main box 14 during the manufacturing process for the brood box 10. As such, the bottom board 66 comprises the floor 66 of the brood box 10. The result is a five-sided cube that is of unibody construction (i.e., the four side walls 22-34 and the bottom board 66 form a unitary structure which defines the hollow box cavity 18) with no seams and no openings however small yet sufficient in size for unwanted cold air to enter and flow through. The only openings in the brood box 10 are the three openings 46, 54, 70—each for the specific purpose described herein. Also, no thermal bridges or connections to outside air exist with this unibody design.

By integrating the bottom board 66 as part of the overall seamless brood box 10, the present invention eliminates the separate bottom board from the vertical stack of components in a traditional Langstroth beehive. The Langstroth bottom board usually acts as an open door or gate for ants and other unwanted pests to easily enter the Langstroth brood box and hive and cause problems for the bees inside. Thus, the brood box 10 of the present invention eliminates this pest problem from the overall beehive by eliminating the Langstroth beehive type of bottom board.

In addition, the bottom board or floor 66 of the brood box 10 has a drain opening 70 formed therein at an approximate center of the floor 66. The drain opening 70 is the third of the three openings 46, 54, 70 formed in the sidewalls 22-34 and the bottom board 66 of the brood box 10. The drain opening 70 facilitates the draining of water and other liquids or moisture that accumulate or condense inside the brood box 10 out from the bottom of the brood box 10. This is accomplished by angling the floor 66 slightly downward towards the center of the brood box 10

The debris tray 58 may be located just above the drain opening 70 inside the brood box 10. Also located above the debris tray 58 and inside the brood box 10 may be a false bottom tray 74 which comprises a screen or a perforated grate that allows relatively small sized mites, pests, and debris (but not the bees) to pass through and down into the debris tray 58 where they can be easily removed by the beekeeper. The false bottom screened tray 74 may rest on an indented shoulder or "stepped" surface 78 that is formed in the bottom board or floor 66 and all around its perimeter. Thus, the false bottom screened tray 74 forms the "false" bottom of the brood box 10 for the bees inside, while the debris tray 58 sits or rests on the "true" bottom of the brood box 10. Unlike traditional wooden or plastic hives which have an exterior bottom board and/or screened bottom, the brood box 10 of exemplary embodiments of the present invention completely integrates that functionality into the insulated envelope of the brood box 10.

Referring also to FIG. 4, each of the four sidewalls 22-34 has an upper surface 82 that together define the top perimeter of the main box 14 of the brood box 10. Each of these upper surfaces 82 may be angled or sloped in a direction away from the central cavity 18. In exemplary embodiments, the angle may be 20 degrees at the outermost portions of the upper surfaces 82 and all around the top perimeter. However, values for the angle other than 20 degrees may be utilized. Also, the 20-degree angle or slope plateaus into an approximate one-inch-wide flat rim 86 at the innermost portions of the upper surfaces 82 of the sidewalls 22-34 and all around the top perimeter. The flat rim 86 may connect with the material (e.g., plastic) comprising the inside surfaces of the sidewalls 22-34 of the hollow box cavity 18 of the brood box 10.

The brood box 10 of exemplary embodiments of the present invention also includes an insulated top cover or lid 42 that covers the entirety of the hollow box cavity 18 or main box 14 of the brood box 10. In use, the lid 42 rests on the upper surfaces 82 of the sidewalls 22-34. Preferably, no openings or vents are included in the lid 42. Also, no thermal bridges are present in this design of the lid 42. This is to prevent as much heat as possible from escaping and to prevent any unwanted cold air from entering and flowing through the brood box 10. As such, the hollow box cavity 18 is entirely sealed off from the outside elements, which is desirable during the colder winter months when the bees are not foraging outside the hive for nectar (in Northern climates—approximately October through April). This is important during the colder winter months so that no heat escapes and no cold air enters and flows inside of the brood box 10 to potentially harm the bees inside.

As best seen in FIGS. 3 and 4, an undersurface 90 of the lid 42 has a portion 94 that is angled at 20 degrees around the entire perimeter of the insulated lid 42. This angle matches the 20-degree angle on the top or upper surfaces 82 of the sidewalls 22-34. The matching angles facilitate the proper alignment and seating of the lid 90 onto the hollow box cavity 18 or main box 14. It should be noted that the 20-degree angle is purely exemplary. Other values for this angle may be utilized for example, an angle in a range between 20 and 30 degrees. It suffices for the broadest scope of the present invention that the angle portion 94 of the undersurface 90 of the lid 42 matches exactly or approximately the angle of the upper surfaces 82 of the sidewalls 22—34. The choice of matching angles allows the insulated lid 42 to be properly seated onto and sealed with the hollow box cavity 18 without the need for complicated joinery, gaskets, or locking mechanisms. Also, the matching angles provide a less complicated way to manufacture the brood box 10.

The undersurface 90 of the insulated lid 42 also includes an outer lip portion or rim 98 that overlaps or "telescopes" beyond the outer periphery of the sidewalls 22-34 of the main box 14. The amount of overlap 98 may be, for example, approximately one inch. This overlap or rim 98 extends around the entire outer perimeter of the lid 42 and the outer sidewall periphery of the main box 14. The telescoping rim 98 provides a secure connection of the lid 42 to the main box 14. In addition, one or more interlocking tabs and slots or friction ridges (not shown) may be provided on the lid 42 that provide a positive lock of the lid 42 to the main box 14. As such, the insulated lid 42 snaps into position on the main box 14 and is held in place without the need for latches, buckles, locks, or straps.

Referring to FIG. 5, there illustrated in perspective is a transition plate 102 configured to be disposed inside the brood box 10 of FIGS. 1 and 2, according to exemplary embodiments of the present invention. The transition plate 102 may comprise wood, plastic, or other suitable material. In exemplary embodiments, the transition plate 102 comprises a planar frame or ring having an outer peripheral portion 106 and a central opening or void 110. A plurality of concentric indented spaced grooves 110 is formed in the outer peripheral portion 106. As such, the indented grooves 110 form steps or shelves that are designed to hold and support various sizes of other beehive components or equipment, commercially available standard sized Langstroth supers 118 as described hereinafter (see FIG. 7). Other beehive components that can be placed onto the grooves 110 of the transition plate 102 include spacers, lids, quilt boxes, feeders, bee escapes, etc. The innermost shelf 110 can also hold and support a transparent observation glass in winter and queen excluder in summer as described in greater detail hereinafter. The observation glass or queen excluder is placed within the central opening or void 110 in the transition plate 102. Thus, the transition plate 102 of exemplary embodiments of the present invention is a valuable component of the brood box 10 as it affords the beekeeper the flexibility to use many different types of existing beehive equipment together with the brood box 10 of the present invention.

As best seen in FIGS. 3 and 4, in use the transition plate 102 sits on the flat rim 86 at the innermost portions of the upper surfaces 82 of the sidewalls 22-34 of the main box 14. Notably there is a lateral air gap 122 between an outer edge of the transition plate 102 and an inner flange portion of the undersurface 90 of the insulated lid 42, as well as an upper vertical air gap 126 between the top surface of the transition plate 102 and the central portion of the undersurface 90 of the lid 42. The purpose of these two air gaps 122, 126 is to ensure that there is no thermal bridge or connection for cold air to enter or heat to escape the brood box 10 by way of conduction to and from the insulated lid 42, and for the cold air to make its way down and into the hollow box cavity 18 where the cluster or colony of bees reside in the colder winter months.

In addition, during the colder winter months, a transparent window comprising for example, clear plexiglass, an acrylic, or other suitable see-through material, may be disposed on the innermost shelf 114 formed from one of the sets of indented grooves 114 in the transition plate 102. As such, the clear window covers the inner cavity 110 of the transition plate 102. The use of the clear window functions as an observation window which provides the beekeeper with the ability to observe the inside of the brood box 10. This allows the beekeeper to quickly and easily check the wellness of the bees and take inventory of food stores inside the brood box 10. Advantageously, the beekeeper is not required to remove the air-sealed transition plate 102 to check the health of the bees or to observe food stores, as is required with known, prior art Langstroth beehives.

Furthermore, while the insulated lid 42 sits in an angled relationship to and on top of the main box 14, the lid 42 leaves the air gaps 122, 126 adjacent to but not touching the transition plate 102 inside the main box 14. The air gaps 122, 126 create a thermal break between the lid 42 and the transition plate 102. This is to prevent conduction of heat from the inside to the outside of the main box 14. The construction and design of the insulated lid 42 completes the overall fully insulated envelope around the frames 38 and transition plate 102 located inside the main box 14.

Figure 6:
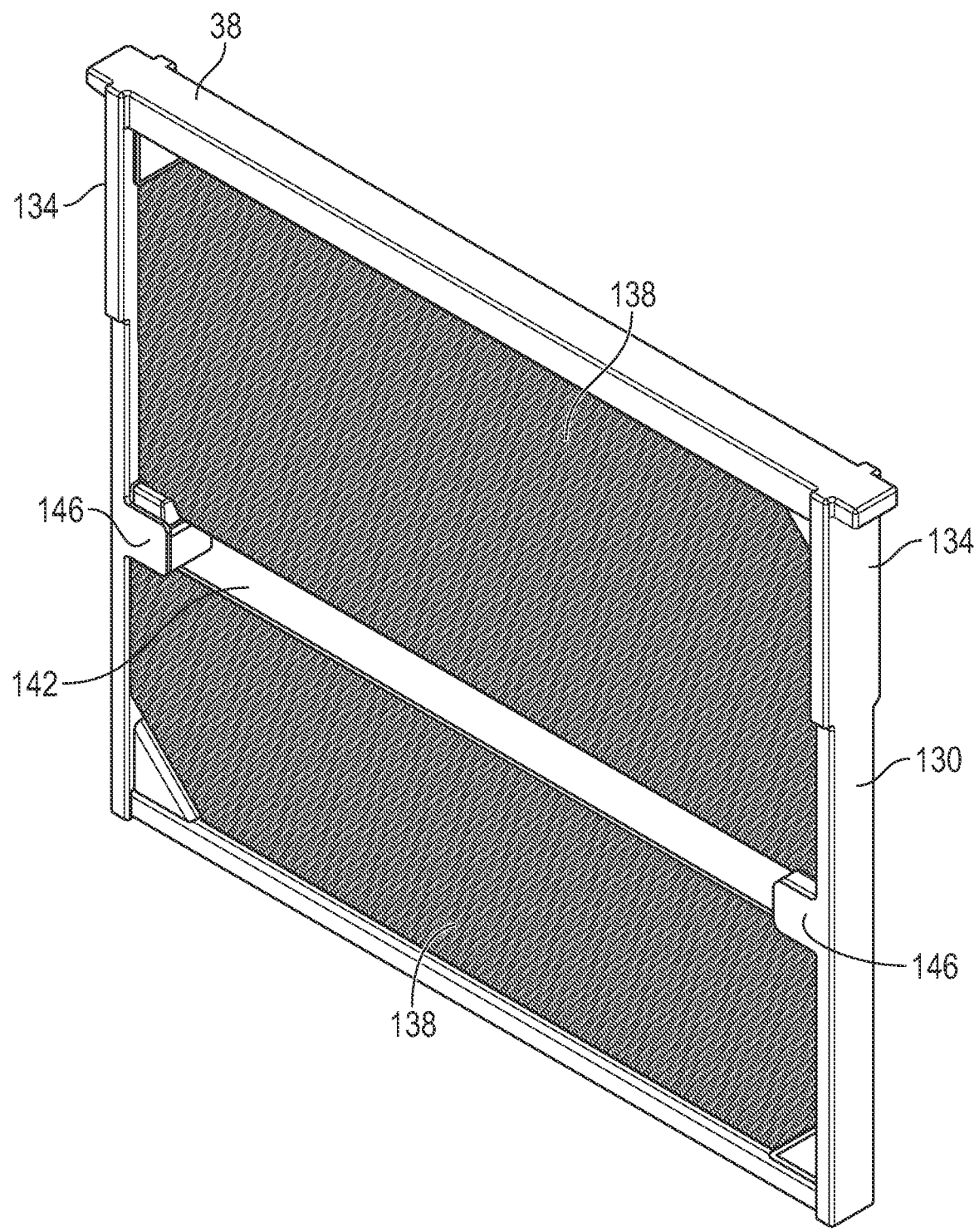
FIG. 6 is a perspective view of a frame configured to be hung inside the brood box of FIGS. 1 and 2, according to exemplary embodiments of the present invention.

Referring to FIG. 6, there illustrated is a comb frame 38 configured to be disposed inside the brood box 10 of FIGS. 1 and 2, according to exemplary embodiments of the present invention. Typically, a plurality of comb frames 38 hangs in parallel inside the hollow box cavity 18 or main box 14 (e.g., from the front to the back inside the main box 14) of the brood box 10.

Each comb frame 38 comprises a rectangular-shaped shell or frame 130 that defines the outer perimeter of the overall comb frame 38. The comb frame 38 may be made from wood, plastic, or other suitable material and may have gusseted corners 134. Inside the outer shell 130 is an opening or cavity into which two artificial comb foundations 138 are placed and are held there. These comb foundations 138 may be standard size planar foundations that are commercially available and for use with Langstroth type beehive frames. For example, the comb frame 38 may be approximately 19 inches wide. The bees use the artificial comb foundations 138 as a starting base on which they make or draw additional comb.

It is known in the prior art of Langstroth beehives to stack a first rectangular brood box on top of a second rectangular brood box to form a vertical stack. Typically, one of the brood boxes is a "deep" box, while the other brood box is a "medium" box. The deep box is greater in height than the medium box. The present inventor has discovered empirically that a deep Langstroth box stacked on top of a medium Langstroth box appears to provide the bees with the most benefit. However, it is also known to stack two deep boxes together or to stack two medium boxes together. Regardless, this type of stacked "double brood box" configuration provides the bees inside with ample living space to carry out their normal activities.

Further, in the known, stacked Langstroth brood box configuration, each brood box has its own plurality of comb frames hanging inside. As such, there are typically 8-10 comb frames inside each box, or a total of 16-20 comb frames in the two-box stacked configuration in the prior art. Such a configuration is problematic in that each time the beekeeper desires to inspect the frames or locate the queen bee, the beekeeper needs to remove and replace up to 20 frames as well as to remove and replace multiple heavy boxes for inspection. This is time consuming and can be physically demanding and harmful to the beekeeper and the bees.

Owing to the beneficial vertical stack configuration of a deep box stacked on top of a medium box, exemplary embodiments of brood box 10 of the present invention utilize a singular brood box 10 that has an overall vertical height for the hollow box cavity 18 or inside of the main box 14 that equals the combined height of a deep Langstroth box and a medium Langstroth box (e.g., approximately 16 inches). As a result, only 8-10 of the comb frames 38 of exemplary embodiments of the present invention are needed to fill the entire hollow box cavity 18. This makes it easier and less time consuming for the beekeeper to inspect the frames 38.

Also, each comb frame 38 has greater surface area on the artificial combs 138 for the bees to draw comb onto. Upon observation, the bees tend to fill in a gap 142 between the two artificial combs 138 of each frame 38 with natural comb. The bees also sometimes leave holes in the combs 138 to allow them to pass through, and they also leave gaps in that space to create room for "queen cells" and drone comb. These are two types of larger comb the bees sometimes shoehorn onto the regular comb foundation. But the open gaps allowed the bees to build what they wanted right in the center of the hive. The other main benefit was that the long continuous, uninterrupted comb was a relatively huge canvas for the queen bee to lay her eggs on. Rather than having to jump over the gaps between regular hanging frames, the queen bee could now lay eggs in her preferred pattern—giant circles of eggs surrounded by pollen and resources. On smaller comb, the queens lay in ½ circles. The larger comb is a closer representation of the natural cavities that bees evolved to survive in inside tree hollows.

The comb frame of FIG. 6 also includes two tabs 146—one on each side of the inside of the outer shell 130 of the frame 38. The tabs 146 function as a support for and a divider between the two artificial combs 138. As such, the space or gap 142 is created between the two combs 138.

Also, the location of each tab 146 can be moved up or down within each frame 38 to accommodate the desired location of the artificial combs 138 within the comb frame 38. For example, as mentioned, the brood box 10 of the present invention, has 8 comb frames hanging side by side inside the box 10 in a parallel arrangement. If each of the 8 frames has the same location for the gap 142 between the two artificial combs 138, then a horizontally oriented air gap would result across the lateral arrangement of the 8 comb frames 38. This may cause problems for the beekeeper as the bees will tend to fill the air gaps horizontally rather than vertically as they are making comb, thus creating a messy "cross comb" situation. Thus, it is desired that such a horizontal lateral air gap be avoided. This can be achieved by staggering the vertical location of the gap 142 between the two artificial combs 138 on each frame 38 laterally across the 8 comb frames 38 in the brood box 10. This can be done through appropriate adjustment of the two tabs 146 on each comb frame 38 to alternate or stagger the air gap 142 from one comb frame 38 to the next within the box 10.

In addition, one or more spacer frames may be provided. Each of these spacer frames is similar to a comb frame 38 yet has a flat blank surface in the center instead of the two artificial combs 138. The spacer frames or blank frames allow the beekeeper to split up or divide the hollow box cavity 18 into two or more separate sections of comb frames 38 within the main box 14. The main reason for the spacer frames is to enable the beekeeper to remove those frames first during an inspection. These smooth frames are free of honey and brood and can be easily pulled out from the main box cavity 18. The resulting space left behind makes removing the regular honey and brood-laden frames 38 easier to lift with much less resistance. The resulting extra space also protects the bees and perhaps the queen bee from being squashed and/or killed when dragging frames 38 against each other. Typical hives have all the frames 38 jammed up tight against each other and numerous bees are "rolled" and killed during inspections when the frames filled with honey and brood are dragged against each other upon removal and replacement. Thus, the spacers are like "dummy" frames which can be slipped in and out without killing the bees.

The brood box 10 of the exemplary embodiments of the present invention described and illustrated herein may have its four sidewalls 22-34 and the integrated bottom 66 (i.e., the five-sided cube) be comprised almost entirely of a food-safe plastic material for example, a high-density polyethylene or "HDPE". That is, the unibody hollow box or main box 14 may comprise an HDPE inner wall 150 and an outer wall 154 for each of the four sidewalls 22-34 and also for the bottom 66 and the lid 42. The distance between the inner and outer walls 150, 154 may be, e.g., three inches, and the distance between the walls 150, 154 of the bottom 66 may be two inches, although other distances may be utilized. The inner walls 150 thus define a hollow space or cavity inside the main box 14.

The brood box 10 may be manufactured using a roto-molded forming process similar to that used to create common drink coolers typically that contain ice. The walls 150, 154 of the hollow space or cavity 18 may be filled with for example, an expanding foam insulation. The resulting brood box 10 with inner and outer walls 150, 154 being spaced apart approximately three inches and having foam insulation therein has a resulting R value of R-15, while the bottom 66 has an R value of R-10. The overall plastic shell of the brood box 10 is completely waterproof, snow proof, windproof, pest resistant, and UV resistant, and is long lasting and largely maintenance free.

Also, the insulated lid 42 can be constructed or manufactured in a similar manner as the hollow box or main box 14. That is, the lid 42 may be constructed using a rotomolded forming process. The insulated lid 42 may have a four-inch-thick HDPE hollow wall structure which is injected and filled with expanding foam insulation, thereby having a R value of R-20.

In the alternative, the main box 14 and the lid 42 may be manufactured using only polystyrene. That is, the hollow box or main box 14 and the lid 42 may be constructed or formed entirely out of polystyrene. As such, no plastic sidewalls 150, 154 and bottom walls are utilized. The shape and the dimensions along with the unibody nature of the hollow box or main box 14 and the lid 42 may be the same as in the rotomolded embodiment described hereinabove. Thus, instead of molding a plastic shell with hollow walls 150, 154 and then filling the walls 150, 154 with foam, the polystyrene foam may just be injected into appropriate molds. Also, injection molded parts or components may be thermoformed or glued onto the polystyrene shell in a second stage of manufacturing or "overmolded" directly with polystyrene in the first stage of molding.

In this embodiment, various surfaces of the hollow box or main box 14 and the insulated lid 42 may include a thin layer of plastic to prevent wear of the polystyrene foam. The transition plate 102 may have the same functionality. The insulated lid 42 may be made of all foam or be of the same rotomolded plastic walls and foam injection construction as previously described herein. This results in the lid 42 and the main box 14 joining together with the same angle as previously described, yet the surfaces that touch each would have a plastic-to-plastic contact.

Figure 7:
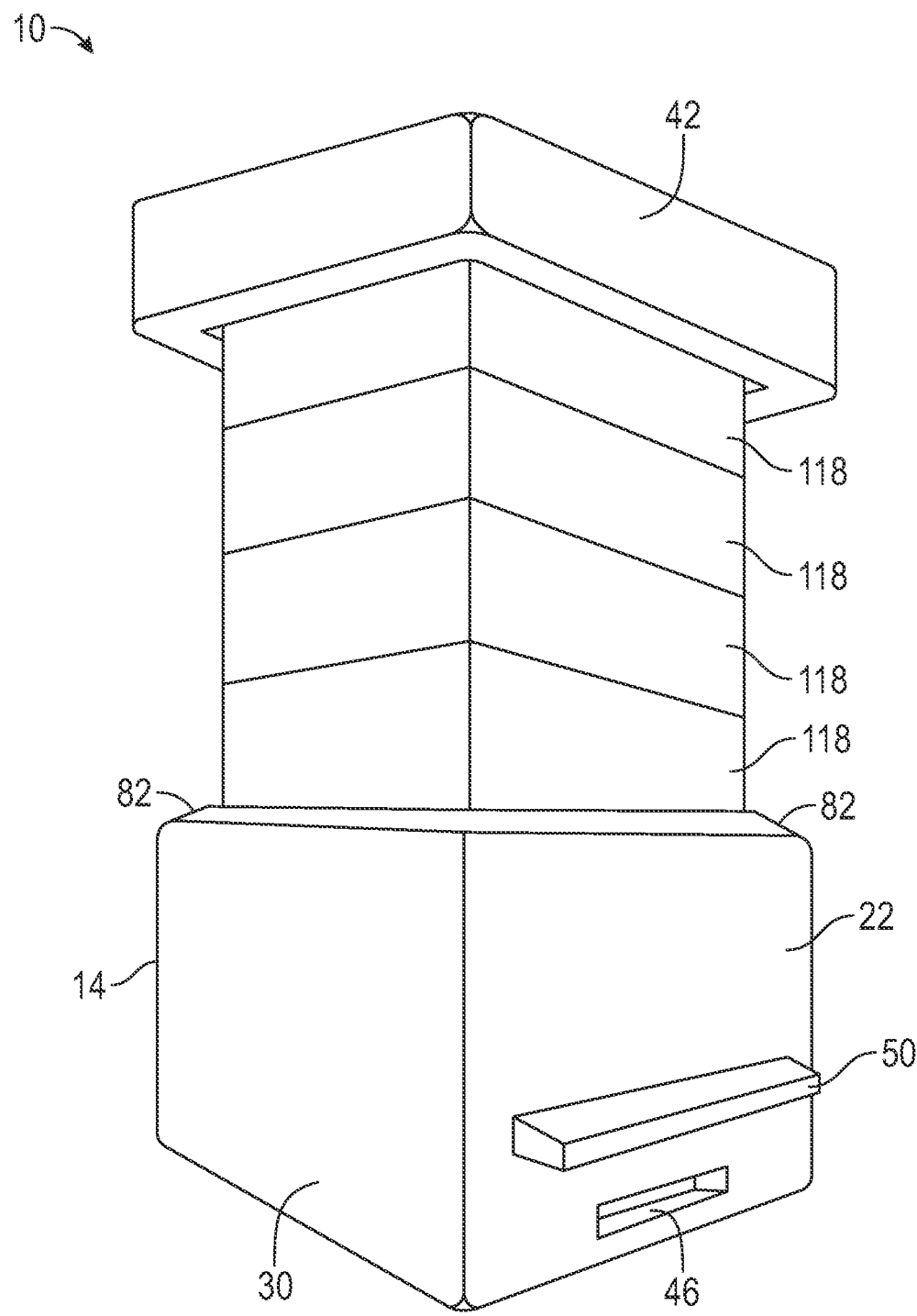
FIG. 7 is a perspective view of the brood box of FIGS. 1 and 2 having several supers disposed on top of the brood box, according to alternative exemplary embodiments of the present invention.

Referring to FIG. 7, there illustrated is the brood box 10 of FIGS. 1 and 2 having four separate supers 118 stacked vertically on top of the brood box 10, according to an alternative exemplary embodiment of the present invention. Each of the supers 118 may comprise the common Langstroth beehive sized wooden non-insulated super. However, other types and sizes of supers 118 may be utilized. It is to be understood that the type and size of super 118 utilized in this alternative embodiment is not part of the broadest scope of the brood box 10 of the present invention. Also, any number of supers 118 may be utilized in this alternative embodiment, the number of supers 118 being limited primarily by the practical height of the resulting stack of supers 118.

In this embodiment, the lowest super 118 of the four supers 118 in the vertical stack is disposed on top of the transition plate 102. Specifically, the lowest super 118 sits on one of the sets of indented grooves 114 in the transition plate 102 (FIG. 5) depending on the overall size of the super 118. The indented grooves 114 formed in the transition plate 102 are of sizes intended to accommodate a variety of different sizes of commercially available supers 118, or other types of commercially available beehive equipment. The remaining three supers 118 shown in FIG. 7 are then stacked on top of each other. The insulated lid 42 is disposed on top of the highest super 118 in the vertical stack of supers 118. Similar to the indented grooves 114 in the transition plate 102, the undersurface 90 of the lid 42 may also have a series of indented grooves that are of various sizes so as to accommodate various sizes of supers 118. As such, the transition plate 102 and the undersurface 90 of the lid 42 are in a mirror image relationship with respect to their respective indented grooves. In this alternative embodiment, the undersurface 90 of the insulated lid 42 is not required to seal off the hollow box cavity 18 from the environment like it is required to do in the exemplary embodiments of FIGS. 1-4.

Furthermore, in this alternative embodiment, the insulated lid 42 is no longer disposed on top of the main box 14, as in the embodiments of FIGS. 1-4 described hereinabove. As such, the lid 42 no longer seals off the hollow box cavity 18 or main box 14 from the outside environment, including any air flow passing through the main box 14. Thus, this type of alternative embodiment of the brood box 10 of the present invention is best suited for use during the warmer summer months when a flow of colder air is non-existent, and a flow of warmer air is of no concern.

In this alternative embodiment, a queen excluder may be disposed to sit on the innermost shelf 114 in the transition plate 102. The queen excluder may comprise a screen or grate having holes that are large enough to allow the smaller worker bees to travel between the brood box 10 and the supers 118. Yet, the holes in the screen or grate are small enough to prevent the queen bee from traveling between the brood box 10 and the supers 118. The use of the queen excluder in warmer summer months is instead of the transparent window being disposed to sit on the innermost shelf 114 of the transition plate 102 during colder winter months, as in the embodiments of the brood box 10 described hereinabove and illustrated in FIGS. 1-4.

Other alternative embodiments of the brood box 10 of the present invention are possible. For example, a liquid feeder reservoir (not shown) may be disposed inside an inner cavity of the lid 42. The reservoir may comprise a flat, flask-shaped box that holds for example, one gallon of liquid feed (e.g., a 1:1 mixture of sugar water or other liquid supplements). The feeder box fits directly into the insulated lid 42 and is filled using a wide screw cap opening on an exposed, lower side of the reservoir. The screw cap may include an integrated drip system that activates when the lid 42 is flipped right side up and placed onto the brood box 10. When in place, the feed drips into an opening in the center of the observation window of the transition plate 102. The bees below the observation window are then able to take the feed from the reservoir. To refill the reservoir, the beekeeper would only need to remove the entire insulated lid 42, flip it over, unscrew the cap, and top off the feed. When flipping the lid 42 back onto the brood box 10, the drip system would then reactivate.

Regarding another alternative embodiment of the brood box 10 of the present invention, one way to create a new colony of bees is to place two frames 38 of brood (one with fresh eggs), a frame of honey and pollen, and an empty frame 38 into a small, four-frame box called a "nuc" ("nuke") where "nuc' is short for "nucleus hive." The nucleus hive has all the resources worker bees need to create a new queen bee. Once these four frames 38 are placed into a nuc and worker bees are shaken into the box, they will immediately realize they are queenless and go to work raising a new queen bee from an egg of their choice. In about 13-16 days, a queen bee will emerge and she will then fly from the nuc to mate. She will return to the nuc and begin to lay eggs on the empty frame 38 inside the nuc. These nucleus colonies will build up to full strength within a couple months and can then be sold or be transferred to a full-size hive box 10 to become a full-size colony.

A popular nuc design is called a "Double Nuc" or a "Resource Hive". This is a box 10 that has two nuc cavities side by side. It is basically a 10-frame box 10 with a full divider, lengthwise, down the middle. This leaves space for four frames 38 to hang on one side and four frames 38 to hang on the other side. However, one side of this box 10 has an entrance facing at the 12 o'clock position and the other is facing at the 6 o'clock position. Thus, each nucleus colony's bees fly in and out in opposite directions so as not to get in each other's way.

In light of the foregoing, an accessory is a Nuc Box Conversion Kit (not shown). This would allow a standard Langstroth brood box to be turned into a Double Nuc Resource Hive. The kit includes a removable divider that separates the main brood cavity 18 into two sides and keeps each colony divided. The front entrance 46 is then also divided with a Y-shaped insert which fits into the main entrance 46 in the front 22 of the brood box 10, but it divides the opening 46 so each colony can enter their own side. The entrance divider insert would create two tunnels offset at a 90° to 180° angle.

The brood box 10 of the various exemplary embodiments of the present invention described and illustrated herein has many advantages over known, prior art brood boxes. These include the brood box 10 being of unibody structure and construction and being fully insulated with seamless, continuous insulation and no unnecessary venting. This overcomes many of the problems caused by unnecessary and potentially harmful heat loss and cold airflow in prior art brood boxes that were not fully insulated, or which used insulation that wasn't continuous.

Also, the four sides 22-34 and the bottom 66 of the brood box 10 are formed or manufactured to be contiguous with each other and at right angles to each other. This seamless, unibody structural configuration of the brood box 10 is in stark contrast to and teaches away from known, prior art Langstroth type brood boxes in which each of the four sides is typically a separate panel with the panels are then joined together or attached to each other at right angles using an adhesive such as glue or a fastener such as nails. This type of brood box is then placed on top of a separate bottom board. This can lead to problems in that heat can escape from the brood box and cold air can enter the brood box at the joint openings between adjoining sides and at the interface of the sides with the bottom board. In contrast, the seamless unibody configuration of the brood box 10 of the present invention has no air vents, which eliminates the potential for heat to escape from and undesirable cold air to enter the brood box 10 and endanger the bees living inside as well as to make temperature and humidity regulation more difficult and resource-intensive.

In addition, unlike a traditional Langstroth wooden brood box, the interior of the brood box 10 of the present invention can be easily and completely cleaned and sanitized if necessary. Further, unlike wooden brood boxes, the brood box 10 of the present invention is designed to last for decades with little or no maintenance required over its lifetime.

Furthermore, the seamless unibody design of the brood box 10 is intentionally simple. This is to make manufacturing of the brood box 10 easy and simple, to eliminate cracks and crevices and embellishments which would attract dirt and debris and create nesting places for pests, and to create a clean, pleasing shape to place outside in the bee yard. Also, the inside corners of the brood box 10 are rounded everywhere to assist the bees in keeping the interior clean and to help smooth any air flow. Traditional wooden hives or other hives with complicated joinery have sharp angles and corners which create crevices which can house pests, mold, and bacteria.

During the colder winter months when no supers 118 are stacked on top of the brood box 10, the brood box 10 is fully insulated and has just one opening (i.e., the main entrance 46) on the front face of the brood box 10, as described and illustrated in detail hereinabove. The provision of this opening in the brood box 10 together with the full insulation prevents a flow of cold air from passing through the brood box 10. As such, the brood box 10 of exemplary embodiments of the present invention is in direct contravention to the decades of prior art which taught the use of multiple openings in the brood box and beehive to create an airflow therethrough in the colder winter months. This was on the mistaken belief that such an airflow was beneficial to the bees inside. The main entrance 46 near the bottom for ingress and egress of the bees is all that the bees need to circulate and replace fresh air in the brood box 10.

Also, the four-season insulation of the brood box 10 eliminates the need to add or replace insulation every winter. Knowing the bees are always insulated eliminates the worry of late spring cold snaps and resulting brood loss. Further, the extra insulation and lack of unnecessary, extra ventilation (the main entrance is the only ventilation) allows the bees to survive with hardly any resources consumed, which mitigates the need for emergency feeding of the bees in the winter. The peace of mind and reduction of stress afforded the beekeeper in knowing the bees are fed and protected from the elements is new and welcome. The brood box 10 of the present invention gives the bees the environmental conditions they need to take care of themselves and make the beekeeper's life easier.

The design of the brood box 10 of the present invention resembles the dimensions and climate conditions inside a hollow tree. Hollow trees are where bees have evolved to survive for millions of years. Hollow trees do not have ventilation and will certainly not be only ¾" thick, which are two things that define nearly all beehives on the market today. The brood box 10 of the present invention is vertically oriented and the cavity 18 inside is thermally isolated from the outside climate.

In addition, the brood box 10 of the present invention eliminates the need to lift the relatively heavy brood box 10. Instead, a beekeeper only needs to lift the individual frames 38 during inspections. Also, the beekeeper can keep the bees in the equivalent of 18 deep frames, but only needs to lift ten frames 38 to see the entire picture inside of the brood box 10. Further, the brood box 10 works with the beekeeper's existing wooden ware, which goes above and beyond a traditional Langstroth type of brood box. The box does not require assembly, or maintenance of any kind.

Furthermore, the supers 118 are removed from the stack above the brood box 10 when the supers 118 are not needed during the colder winter months. As such, the bees are condensed into the fully insulated brood box 10 that is no larger or smaller than the bees require. The bees only need to heat the space they are filling, and there is no wasted energy.

Thus, the brood box 10 of the exemplary embodiments of the present invention described and illustrated herein has numerous significant advantages as compared to known, prior art brood boxes.

The terminology used herein is for the sole purpose of only describing particular exemplary embodiments of the present invention and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, steps, operations, elements, parts and/or components, but do not preclude the presence or addition of one or more features, steps, operations, elements, parts, components and/or groups thereof other than those explicitly described and illustrated herein.

While the invention is provided in detail in connection with only a limited number of exemplary embodiments, it should be readily understood that the invention is not limited to such disclosed embodiments. Rather, the invention can be modified to incorporate any number of variations, alterations, substitutions, or equivalent arrangements not heretofore described, but which are nevertheless commensurate with the spirit and scope of the invention. Additionally, while various exemplary embodiments of the invention have been described, it is to be understood that these exemplary embodiments may include only some of the described exemplary aspects. Accordingly, the invention is not to be seen as limited by the foregoing description but is only to be limited by the scope of the claims appended hereto.

The invention claimed is:

1. A brood box for a beehive, comprising:
a main box having a plurality of sides and a bottom configured to be in a continuous and seamless unibody structure and defining a cavity inside the main box, each of the plurality of sides and the bottom being continuously insulated with one another to thereby insulate and isolate the main box cavity from an environment outside of the brood box;
a transition plate having a planar frame or ring having an outer peripheral portion and a central opening or void, wherein a plurality of concentric indented spaced grooves are formed in the outer peripheral portion, the grooves being capable of holding and supporting beehive components and equipment, wherein the transition plate is configured to be disposed on top of the main box cavity; and
an insulated lid configured to interface with the plurality of sides of the main box and being disposed to cover the main box cavity and the transition plate in certain weather conditions.

2. The brood box of claim 1, further comprising one or more comb frames, each comb frame configured to be disposed within the main box cavity in a hanging relationship therein, wherein at least one of the one or more comb frames includes at least one receptacle configured to receive an artificial comb foundation.

3. The brood box of claim 1, further comprising one or more comb frames, each comb frame configured to be disposed within the main box cavity in a hanging relationship therein, wherein at least one of the one or more comb frames includes a pair of receptacles, each one of the pair of receptacles configured to receive an artificial comb foundation, and wherein each of the one or more comb frames includes a pair of tabs that are adjustable for adjusting a size of each of the pair of receptacles.

4. The brood box of claim 1, further comprising one or more comb frames, each of the one or more comb frames configured to be in physical contact with the main cavity.

5. The brood box of claim 1, wherein the plurality of sides of the main box and the bottom comprises a cube-shaped box having four sides, and wherein the bottom is arranged perpendicular to the four sides of the cube-shaped box.

6. The brood box of claim 1, wherein each one of the plurality of sides, the bottom, and the lid comprises an inner wall and an outer wall having a predetermined spacing therebetween thereby defining a continuous opening between the inner walls and the outer walls.

7. The brood box of claim 6, wherein the continuous opening between the inner walls and the outer walls contains a foam insulation material.

8. The brood box of claim 6, wherein each one of the inner walls and the outer walls comprises a plastic material, and wherein each one of the inner walls and the outer walls are formed using a rotomolded process.

9. The brood box of claim 6, wherein each one of the inner walls and the outer walls comprises high-density polyethylene, and wherein each one of the inner walls and the outer walls are formed using a rotomolded process.

10. The brood box of claim 1, wherein each one of the plurality of sides, the bottom, and the lid comprises polystyrene having a predetermined thickness.

11. The brood box of claim 1, wherein the insulated lid includes an undersurface having a portion that is angled a predetermined amount, wherein a top surface of each one of the plurality of sides has at least a portion that is angled a predetermined amount, and wherein the angled portion of the undersurface of the insulated lid interfaces with angled portion of the top surface of each one of the plurality of sides when the insulated lid is disposed to cover the main box cavity.

12. The brood box of claim 11, wherein the predetermined amount of angle of the portion of the undersurface of the insulated lid equals the predetermined amount of angle of the portion of each one of the plurality of sides.

13. The brood box of claim 1, further comprising a first opening in one of the plurality of sides, the first opening configured to connect the main box cavity with the outside environment such that bees are allowed to pass between the main box cavity and the outside environment.

14. The brood box of claim 1, further comprising a second opening in one of the plurality of sides, the second opening connecting the main box cavity with the outside environment, the second opening having a door associated therewith.

15. The brood box of claim 14, further comprising:
a movable tray disposed in the main box cavity and configured to collect debris and insects within the main box cavity, wherein the movable tray is operable to be moved out of the main box cavity and into the outside environment by movement through the second opening; and
a false bottom tray having a screen configured: (1) to pass the debris and insects within the main box cavity to the movable tray for collection thereby; and (2) to prevent bees within the main box cavity from passing to the movable tray.

16. The brood box of claim 1, further comprising a drain opening in the bottom of the main box, the drain opening configured to connect the main box cavity in fluid communication with the outside environment such that any liquid or moisture inside the main box cavity is allowed to flow from the main box cavity through the drain opening and out to the outside environment.

17. The brood box of claim 1, wherein the transition plate is configured to be disposed on a top surface of each of the plurality of sides.

18. The brood box of claim 17, wherein the transition plate includes a shelf for either: a transparent window configured to allow viewing of the one or more comb frames within the main box cavity, or, a queen excluder device, depending on the time of year.

19. The brood box of claim 1, wherein the transition plate is configured to be disposed on top of the plurality of sides and at a spaced apart distance from any part of the insulated lid, thereby preventing any thermal connection between the main box cavity and the outside environment.

20. The brood box of claim 1, wherein the transition plate includes one or more spaced grooves, each of the one or more grooves configured to support at least one of a plurality of items resting on the grooves, the plurality of items being from the group including a honey super, a spacer, a quilt box, a feeder, and a bee escape.

* * * * *